United States Patent
Kalantari et al.

(10) Patent No.: US 12,549,241 B2
(45) Date of Patent: Feb. 10, 2026

(54) BEAM TRAINING OF A RECEIVER DEVICE

(71) Applicant: Telefonaktiebolaget LM Ericsson (publ), Stockholm (SE)

(72) Inventors: Ashkan Kalantari, Malmö (SE); Bipin Balakrishnan, Malmö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 323 days.

(21) Appl. No.: 18/562,449

(22) PCT Filed: May 21, 2021

(86) PCT No.: PCT/EP2021/063653
§ 371 (c)(1),
(2) Date: Nov. 20, 2023

(87) PCT Pub. No.: WO2022/242876
PCT Pub. Date: Nov. 24, 2022

(65) Prior Publication Data
US 2024/0250738 A1    Jul. 25, 2024

(51) Int. Cl.
*H04B 7/06* (2006.01)
*H04B 17/318* (2015.01)

(52) U.S. Cl.
CPC ....... *H04B 7/06952* (2023.05); *H04B 7/0617* (2013.01); *H04B 17/328* (2023.05)

(58) Field of Classification Search
CPC ... H04B 7/06952; H04B 7/328; H04B 7/0617
See application file for complete search history.

(56) References Cited

U.S. PATENT DOCUMENTS 10,277,349 B1 * 4/2019 Kotecha .............. H04B 7/0695
10,431,888 B2 * 10/2019 Seol .................... H04B 7/0408
(Continued)

OTHER PUBLICATIONS

International Search Report and Written Opinion dated Feb. 22, 2022 for International Application No. PCT/EP2021/063653 filed May 21, 2021, consisting of 12-pages.
(Continued)

*Primary Examiner* — Kenny S Lin
(74) *Attorney, Agent, or Firm* — Weisberg I.P. Law, P.A.

(57) ABSTRACT

A method and other arrangements are disclosed for beam training of a receiver device configured for beamforming reception from a transmitter. The beam training is based on a plurality of multi-arm reception beams. The method includes performing signal strength measurements for each of the multi-arm reception beams, selecting one of the multi-arm reception beams based on the signal strength measurements, nulling one arm for the multi-arm reception beam, and updating the signal strength measurements by performing signal strength measurements for the multi-arm reception beam with the arm nulled. The method also includes iteratively repeating the selecting, nulling, updating and determining steps so as to obtain further signal strength measurements for multi-arm reception beams with additional arms nulled, selecting a reception beam, based on the signal strength measurements before and after the updates and selecting a reception beam based on the signal strength measurements before and after the updates.

16 Claims, 5 Drawing Sheets

(56) References Cited

U.S. PATENT DOCUMENTS

| | | | | |
|---|---|---|---|---|
| 10,477,417 | B2* | 11/2019 | Raghavan | H04W 24/02 |
| 2015/0141010 | A1* | 5/2015 | Kludt | H04B 7/0434 |
| | | | | 455/435.1 |
| 2016/0337016 | A1* | 11/2016 | Capar | H04B 7/0639 |
| 2019/0124585 | A1 | 4/2019 | Katabi et al. | |
| 2019/0253108 | A1 | 8/2019 | Zhang et al. | |
| 2020/0145068 | A1 | 5/2020 | Chendamarai Kannan et al. | |
| 2021/0050892 | A1 | 2/2021 | Park et al. | |
| 2021/0058131 | A1 | 2/2021 | Zhu et al. | |
| 2021/0135728 | A1* | 5/2021 | Raghavan | H04B 17/336 |
| 2021/0282114 | A1* | 9/2021 | Liu | H04W 72/046 |
| 2021/0399779 | A1* | 12/2021 | Raghavan | H04B 7/06954 |
| 2022/0247477 | A1* | 8/2022 | Ryu | H04B 7/06952 |

OTHER PUBLICATIONS

C. You et al.; Fast Beam Training for IRS-Assisted Multiuser Communications; arXiv; Jun. 27, 2020, consisting of 5-pages.

H. Yan et al.; Compressive Initial Access and Beamforming Training for Millimeter-Wave Cellular Systems; arXiv; Jan. 31, 2019, consisting of 14-pages.

W. Wu et al.; Fast mmwave Beam Alignment via Correlated Bandit Learning; IEEE Transactions on Wireless Communications, vol. 18, No. 12; Dec. 2019, consisting of 15-pages.

X. Li et al.; Fast Beam Alignment for Millimeter Wave Communications: A Sparse Encoding and Phaseless Decoding Approach; arXiv; Nov. 9, 2018; consisting of 14-pages.

W.M. Chan et al.; Kolmogorov Model for Large Millimeter-Wave Antenna Arrays: Learning-based Beam-Alignment; 2019 53rd Asilomar Conference on Signals, Systems, and Computers; 2019, consisting of 5-pages.

Q. Xue et al.; Beam Management for Millimeter-Wave Beamspace MU-MIMO Systems; IEEE Transactions on Communications, vol. 67, No. 1; Jan. 2019, consisting of 13-pages.

Q. Xue et al.; Beamspace SU-MIMO for Future Millimeter Wave Wireless Communications; IEEE Journal on Selected Areas in Communications, vol. 35, No. 7; Jul. 2017, consisting of 12-pages.

S. Rangan et al.; Millimeter-Wave Cellular Wireless Networks; Potentials and Challenges; Proceedings of the IEEE, vol. 102, No. 3; Mar. 2014, consisting of 20-pages.

H. Hassanieh et al.; Fast Millimeter Wave Beam Alignment; Special Interest Group on Data Communication (SIGCOMM); 2018, consisting of 14-pages.

M.R. Akdeniz et al.; Millimeter Wave Channel Modeling and Cellular Capacity Evaluation; IEEE Journal on Selected Areas in Communications, vol. 32, No. 6; Jun. 2014, consisting of 16-pages.

\* cited by examiner

BEAM TRAINING OF A RECEIVER DEVICE

CROSS-REFERENCE TO RELATED APPLICATION

This application is a Submission Under 35 U.S.C. § 371 for U.S. National Stage Patent Application of International Application Number: PCT/EP2021/063653, filed May 21, 2021 entitled "BEAM TRAINING OF A RECEIVER DEVICE," the entirety of which is incorporated herein by reference.

TECHNICAL FIELD

The present disclosure relates generally to the field of wireless communication. More particularly, it relates to beam training of a receiver device for beamforming wireless reception.

BACKGROUND

In some wireless communication scenarios, beamforming is used at the transmitter and at the receiver. For such systems to achieve proper performance, beam training is typically applied.

Beam training can aim for selection of a suitable transmission beam among a plurality of possible transmission beams. Alternatively or additionally, beam training can aim for selection of a suitable reception beam among a plurality of possible reception beams. This disclosure relates to beam training for a receiver device; i.e., reception beam selection.

Various approaches exist for reception beam selection. However, many of the available approaches suffer from one or more drawbacks (e.g., relatively high utilization of radio resources for beam training signaling, relatively large beam training signaling overhead, relatively inefficient beam training measurement procedure, a need to make specific assumptions or assume prior knowledge about the radio channel, etc.).

"Fast Millimeter Wave Beam Alignment" by Hassanieh, Abari, Rodriguez, Abdelghany, Katabi, and Indyk; in Special Interest Group on Data Communication (SIGCOMM), Budapest, Hungary, 2018 explains that existing systems scan the beam space to find the best alignment between transmitter and receiver beams, and that such a process has been shown to introduce relatively long delays (up to seconds) which makes it unsuitable for some wireless communication situations. An approach is proposed in which the need to scan all spatial directions is avoided by using multi-armed beams, which simultaneously sample the signal along multiple directions. Although this may lead to improvement, one or more drawbacks (e.g., any of the above-mentioned drawbacks) may still be insufficiently addressed.

Therefore, there is a need for alternative approaches to beam training for a receiver device. Preferably, such approaches mitigate at least one of the above-mentioned drawbacks.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a method for beam training of a receiver device configured for beamforming reception from a transmitter. The beam training is based on a plurality of multi-arm reception beams.

The method comprises performing signal strength measurements for each of the multi-arm reception beams, selecting one of the multi-arm reception beams based on the signal strength measurements, nulling one arm for the multi-arm reception beam, updating the signal strength measurements by performing signal strength measurements for the multi-arm reception beam with the arm nulled; and determining a difference between signal strength measurements before and after the update.

The method also comprises iteratively repeating the selecting, nulling, updating and determining steps so as to obtain further signal strength measurements for multi-arm reception beams with additional arms nulled; and selecting a reception beam, based on the signal strength measurements before and after the updates.

In some embodiments, the method further comprises stopping the iteration when a stopping criterion is met.

In some embodiments, the stopping criterion comprises one or more of: a nulled arm corresponding to an arm signal strength that exceeds a first threshold value, and none of the multi-arm reception beams having a signal strength that exceeds a second threshold value.

In some embodiments, selecting one of the multi-arm reception beams based on the signal strength measurements comprises selecting a multi-arm reception beam with a highest signal strength among the multi-arm reception beams.

In some embodiments, nulling one arm for the selected multi-arm reception beam comprises nulling a randomly picked arm that has not yet been nulled.

In some embodiments, nulling one arm for the selected multi-arm reception beam comprises nulling an arm with a highest arm signal strength—among arms that have not yet been nulled—obtained during a previous beam training session.

In some embodiments, nulling one arm for the selected multi-arm reception beam comprises nulling an arm with a highest statistical signal strength—among arms that have not yet been nulled—according to an applied channel model.

In some embodiments, the method further comprises determining a difference between signal strength measurements before and after the update.

In some embodiments, selecting the reception beam is based on the determined difference.

In some embodiments, selecting the reception beam based on the determined difference comprises selecting the reception beam as an arm that corresponds to a highest difference among arms nulled during signal strength measurements.

In some embodiments, the method is performed for each of a plurality of transmission beams of the transmitter.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an apparatus for beam training of a receiver device configured for beamforming reception from a transmitter, wherein the beam training is based on a plurality of multi-arm reception beams.

The apparatus comprises controlling circuitry configured to cause performance of the method described above.

The apparatus may be incorporated in a receiver device or a user equipment.

An advantage of some embodiments is that the search for an acceptable beam is accelerated by dynamically adapting the search (instead of searching deterministically, e.g., using a round robin approach).

An advantage of some embodiments is that the search for an acceptable beam is accelerated by using statistical knowledge of the signaling environment (i.e., the wireless channel). For example, such knowledge may be used for one or more of: the stopping criteria, the multi-arm reception beam selection, and the arm nulling.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where alternative approaches to beam training for a receiver device are provided.

Figure 1:
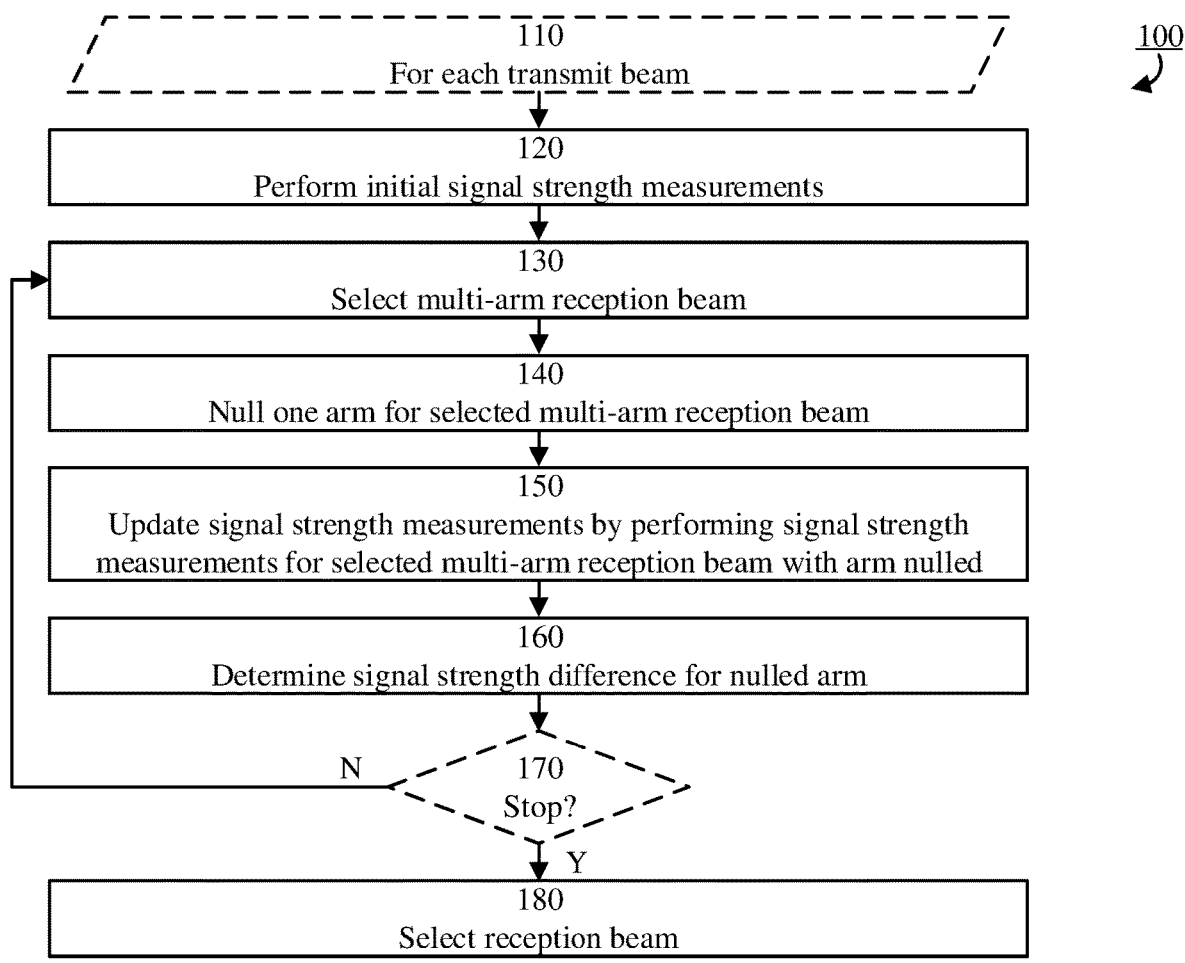
FIG. 1 is a flowchart illustrating example method steps according to some embodiments.

FIG. 1 is a flowchart illustrating an example method 100 according to some embodiments. The method 100 is for beam training of a receiver device configured for beamforming reception from a transmitter. The beam training is based on a plurality of multi-arm reception beams. For example, the method 100 may be performed by the receiver device.

Generally, a multi-arm reception beam may be defined as a combination of two or more reception beams (e.g., from a reception beam code book). Activating a multi-arm beam for reception may be defined as simultaneously activating the two or more reception beams for reception. Thus, performing signal strength measurements for a multi-arm beam may comprise simultaneously performing signal strength measurements for the two or more reception beams.

In some embodiments, a multi-arm reception beam preferably comprises only reception beams which capture signal paths that do not combine destructively at the receiver. For example, the probability that two or more signals combine destructively in the same multi-arm reception beam may be reduced by letting the arms of a multi-arm beam be spatially distanced relatively far apart.

Application of multi-arm reception beams for beam training may provide increased efficiency for the beam training process compared to using single reception beams.

Further exemplification of multi-arm reception beam application is available in "Fast Millimeter Wave Beam Alignment" by Hassanieh, Abari, Rodriguez, Abdelghany, Katabi, and Indyk; in Special Interest Group on Data Communication (SIGCOMM), Budapest, Hungary, 2018.

In step 120, initial signal strength measurements are performed for each of the multi-arm reception beams.

Generally, signal strength measurements may comprise any suitable measurements. Examples include measurements of: received signal strength indication (RSSI), reference signal received power (RSRP), reference signal received quality (RSRQ), signal-to-noise ratio (SNR), signal-to-interference ratio (SIR), signal-to-interference-and-noise ratio (SINR), etc.

In step 130, one of the multi-arm reception beams (an initial multi-arm beam) is selected based on the initial signal strength measurements.

In some embodiments, the initial multi-arm reception beam is selected based on the initial signal strength measurements as the multi-arm reception beam with highest signal strength among the multi-arm reception beams.

In some embodiments, the initial multi-arm reception beam is selected based on the initial signal strength measurements as a multi-arm reception beam with signal strength above a multi-arm signal strength threshold value.

Generally, selecting a multi-arm reception beam with the highest signal strength (or with signal strength above a threshold value) typically reduces the number of measurements that need to be performed to find an acceptable reception beam.

In step 140, one arm (an initial arm) for the selected (initial) multi-arm reception beam is nulled.

In some embodiments, the (initial) arm to be nulled is picked at random among the arms of the multi-arm reception beam. Thus, nulling one (initial) arm for a selected multi-arm reception beam may comprise nulling a randomly picked arm.

In some embodiments, the (initial) arm to be nulled is picked in some determined order (e.g., left to right, or right to left).

In some embodiments, the (initial) arm to be nulled is picked based on the results (signal strength measurements) of a previous beam training session. For example, nulling one (initial) arm for a selected multi-arm reception beam may comprise nulling the arm which has the highest signal strength from a previous beam training session. Alternatively or additionally, nulling one (initial) arm for a selected multi-arm reception beam may comprise nulling an arm which has a signal strength from a previous beam training session above an arm signal strength threshold value. The previous beam training session may be one or more previous beam training sessions. For example, when a most recent beam training session did not provide individual signal strength measurements for all arms of a multi-arm reception beam, results from a less recent beam training session may be used as well.

In some embodiments, the (initial) arm to be nulled is picked based on an applicable channel model. For example, nulling one (initial) arm for a selected multi-arm reception beam may comprise nulling the arm which has the highest statistical signal strength according to an applied channel model. Alternatively or additionally, nulling one (initial) arm for a selected multi-arm reception beam may comprise nulling an arm which has a statistical signal strength according to an applied channel model above an arm signal strength threshold value. For example, the applicable channel model may provide statistical knowledge regarding propagation paths (e.g., number of propagation paths and/or directions of propagation paths) of the wireless channel. Examples include geometry based stochastic channel models.

Generally, nulling an arm based on results of a previous beam training session and/or based on an applicable channel model typically reduces the number of measurements that need to be performed to find an acceptable reception beam.

In step 150, the signal strength measurements are updated by performing (new) signal strength measurements for the (initial) multi-arm reception beam selected in step 130 with the (initial) arm nulled as specified by step 140. Thus, the previous (initial) signal strength measurements for the initial multi-arm reception beam selected in step 130 are replaced by the new signal strength measurements in step 150. Typically, the previous (initial) signal strength measurements for the other multi-arm reception beams are kept unchanged during execution of step 150.

Generally, nulling of an arm may comprise (temporarily) excluding the reception beam corresponding to that arm from activation (or substantially diminishing the reception contribution of that arm) when the multi-arm beam is activated. This can, for example, be achieved by changing the reception beam setting according to any suitable approach. Thus, performing signal strength measurements for a multi-arm reception beam with one or more arm(s) nulled may comprise simultaneously performing signal strength measurements only for the reception beam(s) of the multi-arm reception beam which is/are not nulled.

Typically, steps 130, 140, and 150 are iterated until a stopping criterion is met, as illustrated by optional step 170.

When the stopping criterion is not met (N-path out of step 170), the method 100 returns to step 130, where one of the multi-arm reception beams (a first further multi-arm beam) is selected based on the signal strength measurements as updated in the execution step 150. The selected (first further) multi-arm reception beam may be the same multi-arm reception beam as selected in a previous (the initial) execution of step 130, or may be a multi-arm reception beam not yet selected in any execution of step 130.

In step 140, one arm (a first further arm) for the selected (first further) multi-arm reception beam is nulled. The first further arm to be nulled is a not yet nulled arm of the first further multi-arm reception beam.

In step 150, the signal strength measurements are updated by performing (new) signal strength measurements for the (first further) multi-arm reception beam selected in the most recent execution of step 130 with the (first further) arm nulled as specified by step 140. Thus, the previous signal strength measurements for the first further multi-arm reception beam are replaced by the new signal strength measurements in step 150. Typically, the previous signal strength measurements for the other multi-arm reception beams are kept unchanged during execution of step 150.

If the first further multi-arm reception beam is the same as the initial multi-arm reception beam, the initial arm is typically also nulled (in addition to the first further arm) when the signal strength measurements are performed in step 150.

While the stopping criterion is not met (N-path out of step 170), the method 100 continues to return to step 130, where one of the multi-arm reception beams (a second, third, fourth, etc. further multi-arm beam) is selected based on the signal strength measurements as updated in the most recent execution step 150. The selected (further) multi-arm reception beam may be the same multi-arm reception beam as selected in a previous execution of step 130, or may be a multi-arm reception beam not yet selected in any execution of step 130.

In step 140, one arm (a further arm) for the selected (further) multi-arm reception beam selected in the most recent execution of step 130 is nulled. The further arm to be nulled is a not yet nulled arm of the further multi-arm reception beam.

In step 150, the signal strength measurements are updated by performing (new) signal strength measurements for the (further) multi-arm reception beam selected in the most recent execution of step 130 with the (further) arm nulled as specified by the most recent execution of step 140. Thus, the previous signal strength measurements for the further multi-arm reception beam are replaced by the new signal strength measurements in step 150. Typically, the previous signal strength measurements for the other multi-arm reception beams are kept unchanged during execution of step 150.

If the further multi-arm reception beam is the same as any previously selected multi-arm reception beam, any previously nulled arms of the further multi-arm reception beam remain nulled (in addition to the further arm) when the signal strength measurements are performed in step 150.

In some embodiments, the further multi-arm reception beam is selected in step 130 for each iteration based on the updated signal strength measurements from the most recent execution of step 150, as the multi-arm reception beam with highest signal strength among the multi-arm reception beams.

In some embodiments, the further multi-arm reception beam is selected in step 130 for each iteration based on the updated signal strength measurements from the most recent execution of step 150, as a multi-arm reception beam with signal strength above a multi-arm signal strength threshold value.

In some embodiments, the arm to be nulled is picked at random in step 140 for each iteration, among the (not yet nulled) arms of the multi-arm reception beam. Thus, nulling one arm for a selected multi-arm reception beam may comprise nulling a randomly picked arm that has not yet been nulled.

In some embodiments, the arm to be nulled is picked in some determined order in step 140 (e.g., left to right, or right to left).

In some embodiments, the arm to be nulled is picked based on the results (signal strength measurements) of a previous beam training session in step 140 for each iteration. For example, nulling one arm for a selected multi-arm reception beam may comprise nulling the arm which has the highest signal strength (among arms that have not yet been nulled) from a previous beam training session. Alternatively or additionally, nulling one arm for a selected multi-arm reception beam may comprise nulling an arm (that has not yet been nulled) which has a signal strength from a previous beam training session above an arm signal strength threshold value.

In some embodiments, the arm to be nulled is picked based on an applicable channel model in step 140 for each iteration. For example, nulling one arm for a selected multi-arm reception beam may comprise nulling the arm which has the highest statistical signal strength (among arms that have not yet been nulled) according to an applied channel model. Alternatively or additionally, nulling one arm for a selected multi-arm reception beam may comprise nulling an arm (that has not yet been nulled) which has a statistical signal strength according to an applied channel model above an arm signal strength threshold value.

When the stopping criterion is met (Y-path out of step 170), the method 100 proceeds to step 180, where a reception beam (e.g., one of the arms of one of the multi-arm reception beams) is selected. The selection is based on the signal strength measurements before and after the updates of step 150.

The reception beam selected in step 180 may be used for subsequent communication (i.e., reception of communication signals transmitted from the transmitter using the corresponding transmission beam).

The stopping criterion may be any suitable stopping criterion.

In one example, the stopping criterion comprises that each of the multi-arm reception beams have had all but one of its arms nulled during signal strength measurements.

In one example, the stopping criterion comprises that all expected propagation paths of an applicable channel model have been identified. For example, four different paths of a received signal may be expected for an urban environment. Hence, when four reception beams have been found with signal strength above some threshold value, further measurements are probably unnecessary.

In one example, the stopping criterion comprises that a good enough reception beam has been found. This example may be implemented by letting the stopping criterion comprise that a nulled arm corresponds to a signal strength that exceeds a first threshold value.

In one example, the stopping criterion comprises that there is no prospect of finding a better reception beam than represented by already nulled arms. This example may be implemented by letting the stopping criterion comprise that none of the multi-arm reception beams has a signal strength (from a most recent signal strength measurements of the multi-arm reception beam) that exceeds a second threshold value. For example, the second threshold value may be the same as the first threshold value, or may represent the signal strength of the arm which has the highest signal strength of already nulled arms. This stopping criteria is especially useful if it is known that the signals associated with the different arms of the multi-arm reception are considered to interfere constructively.

Any suitable combination of the above example stopping criteria is also possible.

As illustrated by optional step 160, the method 100 may also comprise determining a difference between signal strength measurements before and after the update of step 150.

The difference may be seen as representing the signal strength of the most recently nulled arm (i.e., the signal strength of the most recently nulled arm is represented by the signal strength for the multi-arm reception beam before the update minus the signal strength for the multi-arm reception beam after the update). This is particularly applicable when there is no destructive combining between different arms of the multi-arm reception beam (or, better, when reception for different arms of the multi-arm reception beam is independent). Typically, the difference is a positive value. In any case, the absolute value of the difference may be used.

The difference of step 160 may be used in step 170.

For example, the difference may be compared to the first threshold value to determine whether the nulled arm is good enough (i.e., whether the nulled arm corresponds to a signal strength that exceeds the first threshold value).

Alternatively or additionally, the difference may be compared to the signal strength(s) of the multi-arm reception beam(s) to determine whether any multi-arm reception beam represent a prospect of improvement over already nulled arms (i.e., whether the signal strength of the multi-arm reception beam exceeds the difference).

Alternatively or additionally, the difference of step 160 may be used in step 180; selecting the reception beam based on the determined difference.

For example, the reception beam may be selected as an arm that corresponds to a highest difference among arms nulled during signal strength measurements.

Alternatively or additionally, the reception beam may be selected as an arm that corresponds to a difference that exceeds a difference threshold value (e.g., the first threshold value of the stopping criterion).

In some embodiments, the method 100 is performed for each transmit beam used in the beam training (e.g., for each of a plurality of transmission beams of the transmitter), as illustrated by 110.

Typically, a beam training session may comprise the transmitter repeatedly transmitting—for signal strength measurements by a receiver—a reference signal using each of a plurality of transmission beams (e.g., from a transmission beam code book) according to some pattern involving use of a plurality of communication resources (e.g., time and/or frequency resources). The pattern may be predefined or dynamic.

The receiver may be aware of the pattern (e.g., by predefinition or via received control signaling). Thus, each signal strength measurement of the method 100 (steps 120 and 150) may be performed may be performed for a respective communication resource where the transmit beam under consideration is used by the transmitter.

Figure 2A:
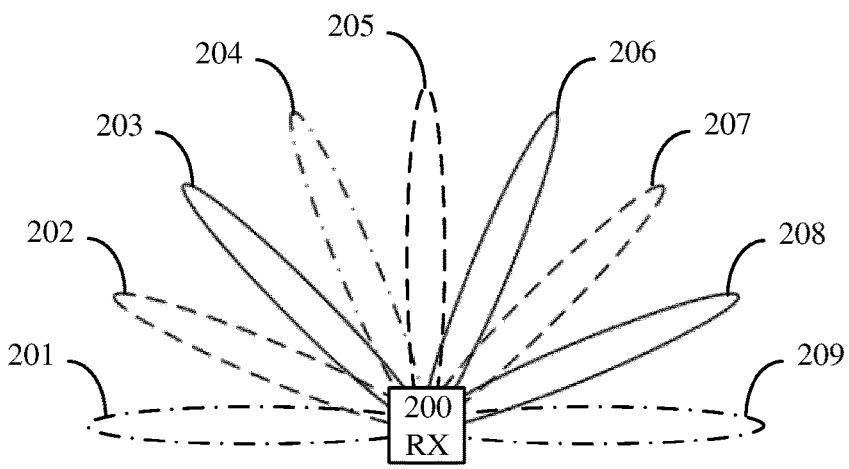
FIG. 2A is a schematic drawing illustrating example multi-arm reception beams.

FIG. 2A schematically illustrates three example multi-arm reception beams for a receiver (RX) 200. The receiver 200 has nine reception beams 201, 202, 203, 204, 205, 206, 207, 208, 209 (e.g., nine reception beams from a reception beam code book). A first multi-arm reception beam is represented by dash-dotted lines and consists of the reception beams (i.e., arms) 201, 204, and 209. A second multi-arm reception beam is represented by dashed lines and consists of the reception beams (i.e., arms) 202, 205, and 207. A third multi-arm reception beam is represented by solid lines and consists of the reception beams (i.e., arms) 203, 206, and 208. Generally, the reception beams may be grouped into multi-arm reception beams in any suitable way. As mentioned before, it may be advantageous that the reception beams of a multi-arm reception beam capture signal paths that do not combine destructively at the receiver.

Figure 2B:
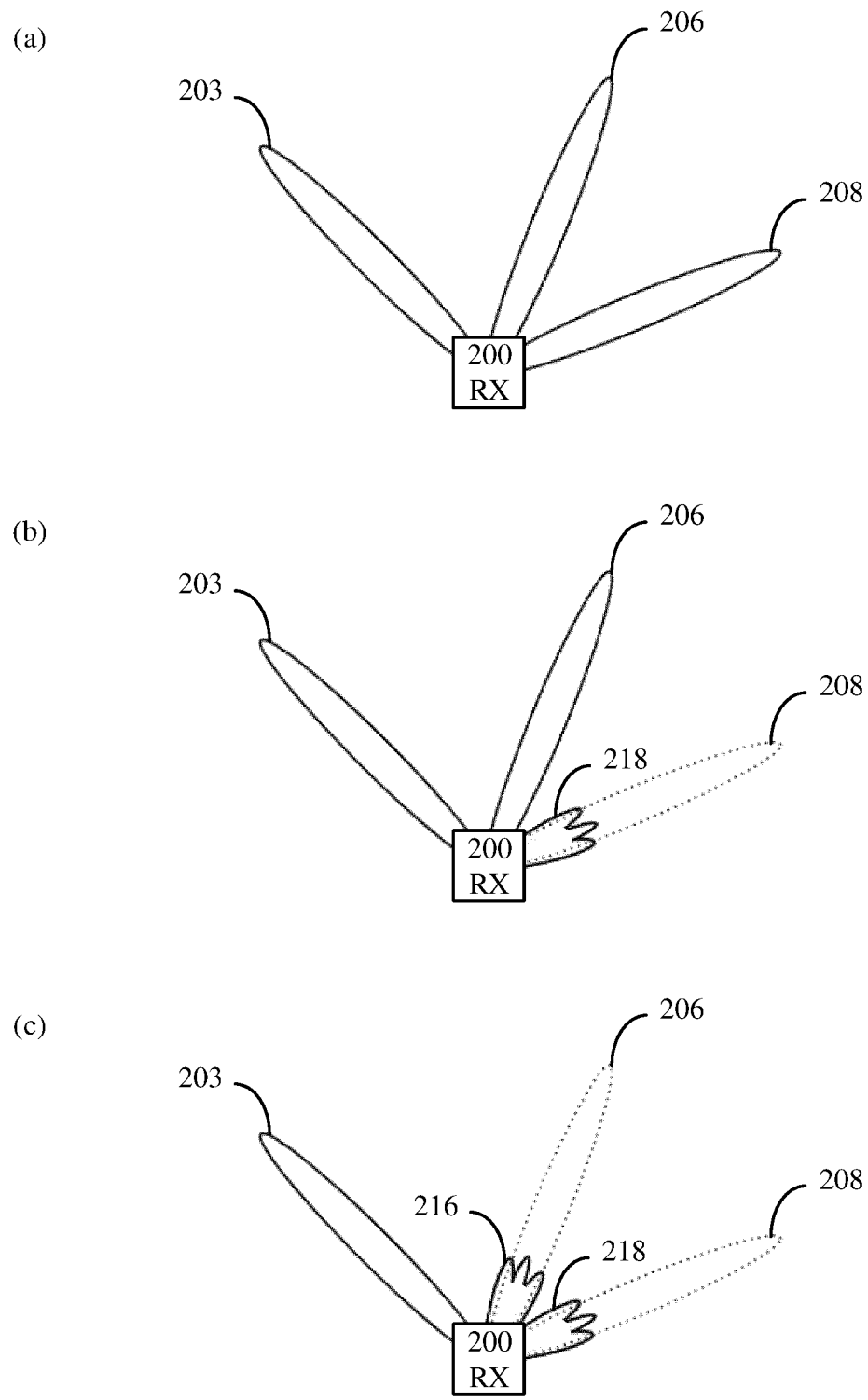
FIG. 2B is a schematic drawing illustrating example nulling of arms of a multi-arm reception beam.

FIG. 2B schematically illustrates example nulling of arms of a multi-arm reception beam that consists of three reception beams (i.e., arms) 203, 206, and 208 (compare with the third multi-arm reception beam of FIG. 2A).

Part (a) of FIG. 2B illustrates a typical setting during initial signal strength measurements for the multi-arm reception beam (compare with step 120 of FIG. 1). As illustrated, no arms are typically nulled during the initial signal strength measurements for the multi-arm reception beam. Thus, the initial signal strength measurements are performed in relation to collective reception via the beams 203, 206, and 208.

Part (b) of FIG. 2B illustrates a typical setting during a first update of signal strength measurements for the multi-arm reception beam (compare with step 150 of FIG. 1). For example, this multi-arm reception beam may have been selected in the most recent execution of step 130 of FIG. 1 (e.g., because it has the currently highest signal strength among the multi-arm reception beams).

As illustrated by 218 in part (b) of FIG. 2B, one arm 208 is nulled during the new signal strength measurements for the multi-arm reception beam. For example, the arm 208 may have been nulled in the most recent execution of step 140 of FIG. 1 (e.g., because it was picked at random among the arms 203, 206, 208).

Thus, the new signal strength measurements associated with the illustration in part (b) of FIG. 2B are performed in relation to collective reception via the beams 203 and 206.

Part (c) of FIG. 2B illustrates a typical setting during a second update of signal strength measurements for the multi-arm reception beam (compare with step 150 of FIG. 1). For example, this multi-arm reception beam may have been selected in the most recent execution of step 130 of FIG. 1 (e.g., because it has the currently highest signal strength among the multi-arm reception beams).

As illustrated by 216 in part (c) of FIG. 2B, another arm 206 is nulled during the new signal strength measurements for the multi-arm reception beam. For example, the arm 206 may have been nulled in the most recent execution of step 140 of FIG. 1 (e.g., because it was picked at random among the not yet nulled arms 203, 206). As illustrated by 218 in part (c) of FIG. 2B, the previously nulled arm 208 remains nulled during the new signal strength measurements for the multi-arm reception beam.

Thus, the new signal strength measurements associated with the illustration in part (c) of FIG. 2B are performed in relation to reception via only the beam 203.

The parts (a)-(c) of FIG. 2B illustrates consecutive nulling for one multi-arm reception beam (e.g., the third multi-arm reception beam of FIG. 2A). Corresponding consecutive nulling is typically applicable for one or more other multi-arm reception beams of a receiver (e.g., the first and second multi-arm reception beams of FIG. 2A).

Furthermore, it should be noted that the order in which updating signal strength measurements are performed for the different multi-arm reception beams may change dynamically (e.g., according to which multi-arm reception beam currently has the highest signal strength; after the most recent update).

For example, referring to FIGS. 1, 2A and 2B, initial signal strength measurements may be performed (step 120 of FIG. 1) for the first, second, and third multi-arm reception beams using different communication resources where the transmission beam under consideration is used for reference signaling. During the initial signal strength measurements, no arms are nulled (compare with part (a) of FIG. 2B for the third multi-arm reception beam).

If the third multi-arm reception beam has highest signal strength of the first, second, and third multi-arm reception beams based on the initial signal strength measurements, the third multi-arm reception beam may be selected (step 130 of FIG. 1) for first new signal strength measurements. During the first new signal strength measurements, one arm is nulled (step 140 of FIG. 1) for the third multi-arm reception beam (compare with part (b) of FIG. 2B). The initial signal strength measurements are updated (step 150 of FIG. 1) based on (e.g., replaced by) the first new signal strength measurements for the third multi-arm reception beam, while the previous (i.e., initial) signal strength measurements remain unchanged in the update for the first and second multi-arm reception beams.

If the first multi-arm reception beam has highest signal strength of the first, second, and third multi-arm reception beams based on the updated signal strength measurements, the first multi-arm reception beam may be selected (step 130 of FIG. 1) for second new signal strength measurements. During the second new signal strength measurements, one arm is nulled (step 140 of FIG. 1) for the first multi-arm reception beam. The initial signal strength measurements are updated (step 150 of FIG. 1) based on (e.g., replaced by) the second new signal strength measurements for the first multi-arm reception beam, while the previous (i.e., initial and previously updated, respectively) signal strength measurements remain unchanged in the update for the second and third multi-arm reception beams.

If the third multi-arm reception beam has highest signal strength of the first, second, and third multi-arm reception beams based on the latest updated signal strength measurements, the third multi-arm reception beam may be selected again (step 130 of FIG. 1), for third new signal strength measurements. During the third new signal strength measurements, one additional arm is nulled (step 140 of FIG. 1) for the third multi-arm reception beam (compare with part (c) of FIG. 2B). The previously updated signal strength measurements are updated again (step 150 of FIG. 1) based on (e.g., replaced by) the third new signal strength measurements for the third multi-arm reception beam, while the previous (i.e., previously updated and initial, respectively) signal strength measurements remain unchanged in the update for the first and second multi-arm reception beams.

This process continues until the stopping criterion is met (step 170 of FIG. 1).

Generally, one benefit of some embodiments if that the beam training process is efficient (e.g., in terms of one or more of: time required, signaling overhead, communication resources used, etc.).

Some embodiment may be particularly suitable for application in relation to wireless communication in the millimeter wavelength (mmWave) range of the radio frequency spectrum. However, it should be noted that the teachings presented herein are not limited to such frequency spectrum ranges.

An advantage with the mmWave range is that it can provide high throughput (e.g., data rates in the order of Giga bits per second). To achieve as high as possible data rates, efficient use of the spectrum may be important. However, compared to using lower frequencies, wireless communication in the mmWave range can more easily get blocked by barriers (e.g., object, human, etc.), which may impair performance. On the other hand, compared to using lower frequencies, antenna arrays for the mmWave range can be smaller.

The antenna arrays can be used to create narrow transmission and/or reception beams (e.g., pencil beams), which enables concentrating transmission energy in, and/or energy reception from, a specific direction. Energy concentration comes with advantages, such as the communication reaching over higher distances, and a possibility to maneuver around link blockages by beam switching and/or beam tilting. Typically, the beam setting needs to be adjusted relatively often to achieve acceptable reception conditions (e.g., SNR, SIR, SINR, etc.). Beam management methods, such as beam training and beam tracking, are generally well known (e.g., from IEEE 802.11 standards).

As mentioned before, using multi-arm reception beams in beam training may be efficient since several beams can be measured at the same time. However, since the measurements are collective for all reception beams comprised in the multi-arm reception beam, there is a need for an approach to determine which reception beam to select. In "Fast Millimeter Wave Beam Alignment" by Hassanieh, Abari, Rodriguez, Abdelghany, Katabi, and Indyk; in Special Interest Group on Data Communication (SIGCOMM), Budapest, Hungary, 2018, an exhaustive search approach is applied which may be inefficient. Some embodiments aim to provide an alternative (and more efficient) approach for determining which reception beam to select.

For example, some embodiments provide an approach for efficient and dynamic beam training to find a reception beam which has a received signal strength measurement above a threshold value when multi-arm reception beams are used for beam training. In some embodiments, statistical knowledge of the mmWave channel may be considered when determining the order in which the reception beams are checked (e.g., which arm to null for a selected multi-arm beam); to further increase efficiency of the beam training.

Figure 3:
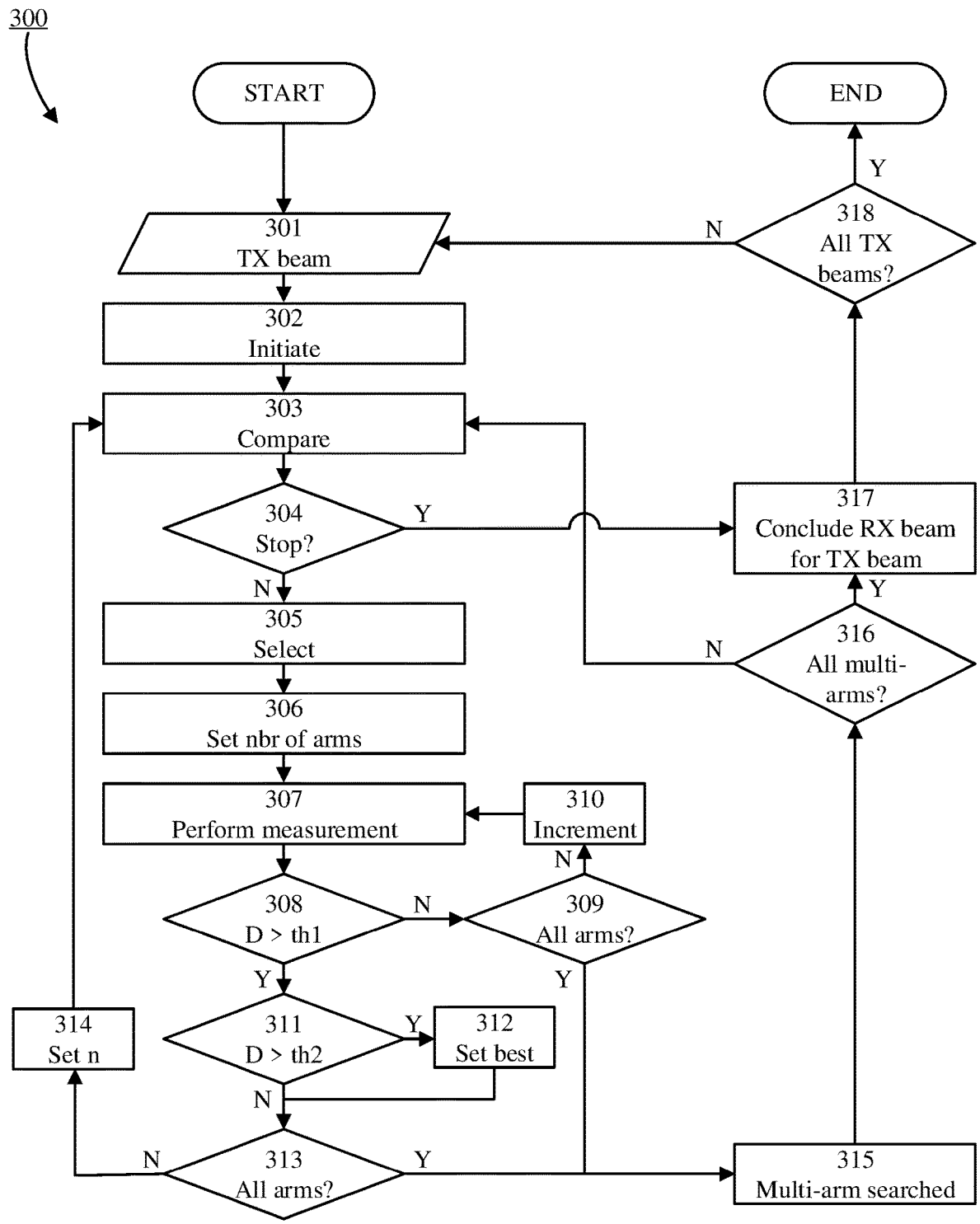
FIG. 3 is a flowchart illustrating example method steps according to some embodiments.

FIG. 3 illustrates an example method 300 according to some embodiments. The method 300 is for beam training of a receiver device configured for beamforming reception from a transmitter. For example, the method 300 may be performed by the receiver device. The method 300 may, for example, be seen as an implementation of the method 100 of FIG. 1.

Instead of exhaustively searching through all arms of all multi-arm reception beams, the multi-arm reception beam with the highest remaining signal strength (e.g., power) is selected for update measurements and one (or more) arm is nulled each time a multi-arm reception beam is selected for update measurements.

As illustrated by 301, the method 300 is performed per transmission (TX) beam (compare with 110 of FIG. 1). The transmitter activates the transmission beam under consideration and repeatedly transmits a reference signal (e.g., a pilot signal), while the receiver activates one multi-arm reception beam for each reference signal transmission to provide initial signal strength measurements (compare with step 120 of FIG. 1).

In step 302, the method 300 is initiated. Assuming that B denotes the set of multi-arm reception beams of the receiver, S denotes the set of searched multi-arm reception beams, p denotes a vector holding the current signal strengths (e.g., remaining powers) of the multi-arm reception beams, n denotes a vector holding the number of nulled arms of the multi-arm reception beams, and $pow_{best}$ denotes the highest signal strength found so far for a reception beam, the initiation comprises setting $S=\emptyset$, p=0, n=0, and $pow_{best}=0$. It should be noted that respective parameter values may be kept for each transmission beam. The initial signal strength measurements for all multi-arm reception beams are stored in p.

In step 303, a comparison is made involving the remaining unchecked power $pow_{res_i}$ of the multi-arm reception beams, the highest discovered power $pow_{best}$, and a threshold value $p_{th}$ representing a required power.

In step 304, it is determined—based on the comparison of step 303—whether to stop the method 300 for the transmission beam under consideration (compare with step 170 of FIG. 1). The Y-path out of 304 is taken to arrive at step 317 when ($\max(pow_{res_i})<pow_{best}$ OR $pow_{best} \geq p_{th}$), where the maximum is taken over all $i \in B-S$ and $pow_{res_i}=p(i)$. This may be interpreted as the Y-path out of 304 being taken when there is no prospect of finding a better reception beam than already found and when the best reception beam found so far is good enough. Otherwise the N-path out of 304 is taken to arrive at step 305.

In step 305, a multi-arm reception beam is selected (compare with step 130 of FIG. 1). The multi-arm reception beam with the highest remaining power in the unexplored arms is selected, which is implemented by setting b=arg max ($pow_{res_i}$), where b is the index of the multi-arm reception beam under consideration.

In step 306, the number a of arms to be nulled in the selected multi-arm reception beam b is set (compare with step 140 of FIG. 1) by incrementing the previously nulled number of arms for b, i.e., a=n(b)+1.

In step 307, measurements are performed for the selected multi-arm reception beam b with a arms nulled (compare with step 150 of FIG. 1). Thus, the transmitter activates the transmission beam and transmits the reference signal, while the receiver nulls a arms of the multi-arm reception beam b and measures the received power p. The power difference between previous and current measurements is determined as $p_{diff_{ba}}=pow_{res_b}-p$ (compare with step 160 of FIG. 1); representing the power of the most recently nulled arm(s). The current signal strength is updated for the selected multi-arm reception beam b; i.e., p(b)=p.

In step 308, it is determined whether the difference D (i.e., $p_{diff_{ba}}$) exceeds a threshold value (th1) represented by $p_{min}$; i.e., whether the most recently nulled arm has a minimum power.

If so, the Y-path out of 308 is taken to arrive at step 311. Otherwise, the N-path out of step 308 is taken to arrive at step 309.

In step 309, it is determined whether all arms of the multi-arm reception beam b have been examined; i.e., whether $a=arms_b-1$, where $arms_b$ denotes the number of arms of the multi-arm reception beam b. If so, the Y-path out of 309 is taken to arrive at step 315. Otherwise, the N-path out of step 309 is taken to arrive at step 310.

In step 310, the number of arms to be nulled for multi-arm reception beam b is incremented, a=a+1. In the method 300, the process then returns to step 307 to perform new measurements for multi-arm reception beam b until an arm is found which has a minimum power. In other implementations, the process might examine another multi-arm reception beam instead.

In step 311, it is determined whether the difference D (i.e., $p_{\text{diff}_{ba}}$) exceeds a threshold value (th2) represented by $p_{\text{best}}$; i.e., whether the most recently nulled arm has the highest power found so far. If so, the Y-path out of 311 is taken to arrive at step 312. Otherwise, the N-path out of step 311 is taken to arrive at step 313.

In step 312, parameters defining the best reception beam found so far are updated as $\text{pow}_{\text{best}} = p_{\text{diff}_{ba}}'$ $\text{best}_{\text{beam}} = b$, and $\text{best}_{\text{arm}} = a$, and the method 300 proceeds to step 313.

In some embodiments, an additional step may be included before entering step 313, wherein the additional step uses knowledge of the number X of propagation paths of the wireless channel as a stopping criterion. Thus, if the expected number of paths have been found, a Y-path out of the additional step may lead to 315. Otherwise, a N-path out of the additional step may lead to step 313.

In step 313, it is determined whether all arms of the multi-arm reception beam b have been examined; i.e., whether $a = \text{arms}_b - 1$. If so, the Y-path out of 313 is taken to arrive at step 315. Otherwise, the N-path out of step 313 is taken to arrive at step 314.

In step 314, the number a of nulled arms for the multi-arm reception beam b is saved for later purposes, n(b)=a, and the method 300 returns to step 303.

In step 315, when the multi-arm reception beam b is fully searched, the set S is updated to include b. Furthermore, the number a of nulled arms for the multi-arm reception beam b is saved, n(b)=a, and the method 300 proceeds to step 316.

In step 316, It is determined whether all multi-arm reception beams have been fully searched; i.e., whether B−S=Ø. If so, the Y-path out of 316 is taken to arrive at step 317. Otherwise, the N-path out of step 316 is taken to arrive at step 303.

In step 317, a reception (RX) beam is concluded for the transmission (TX) beam under consideration (compare with step 180 of FIG. 1); i.e., the reception beam represented by arm $\text{best}_{\text{arm}}$ of multi-arm reception beam $\text{best}_{\text{beam}}$.

Step 318 illustrates that the method 300 returns to 301 if there are more transmission (TX) beams to process. Otherwise, the method 300 is concluded.

It should be noted that, alternatively or additionally to step 304, one or more of steps 308, 309, 311, 313, and 316 may be considered as implementing stopping criteria (compare with step 170 of FIG. 1).

Two numerical examples illustrating the method 300 of FIG. 3 will now be provided, the first example relating to a scenario with only constructive combining at the receiver, and the second example relating to a scenario with both constructive and destructive combining.

For both examples, three multi-arm reception beams are assumed (compare with FIG. 2A), and the received signal strength of each multi-arm beam in the initial measurements is represented by $B_1=25$, $B_2=18$, $B_3=22$, respectively. It is also assumed that a signal strength of 11 is considered acceptable.

The method 300 in FIG. 3 picks the multi-arm reception beam with the highest received signal strength (step 305), nulls one of its arms (step 306), and measures the remaining power (step 307). Assuming that the total received signal for a multi-arm reception beam is denoted by $A_t e^{j\Theta_t}$ and that the remaining signal after nulling the first arm is $A_{t-1} e^{j\Theta_{t-1}}$, the power and phase of the signal of the nulled beam can be concluded to be $A_t e^{j\Theta_t} - A_{t-1} e^{j\Theta_{t-1}} = A_1 e^{j\Theta_1}$. Signal conditions resulting in constructive and destructive combining, respectively, are well known and/or easily derivable by the skilled person.

In the first example, the selection/nulling/measurement sequence can be summarized as until an acceptable reception beam is found:

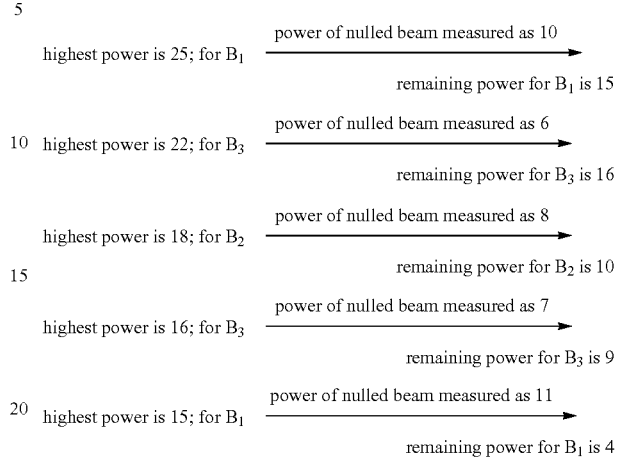

For simplicity, it has been assumed that all signals have the same phase so that the remaining power can be derived by subtracting the power of the nulled beam from the previous power.

Thus, in this first example, the secondly nulled beam of the multi-arm beam $B_1$ satisfies the requirement for acceptable received power of 11. It can be noted that the conclusion is reached in five iterations, which is 44% faster as compared to using teachings of "Fast Millimeter Wave Beam Alignment" by Hassanieh, Abari, Rodriguez, Abdelghany, Katabi, and Indyk; in Special Interest Group on Data Communication (SIGCOMM), Budapest, Hungary, 2018, according to which nine considerations would be needed.

In the second example, it is assumed that one of the arms (the first picked) of the multi-arm beam $B_2$ receives a signal that combines completely destructively with the signals received by the other arms. Then, the selection/nulling/measurement sequence can be summarized as until an acceptable reception beam is found:

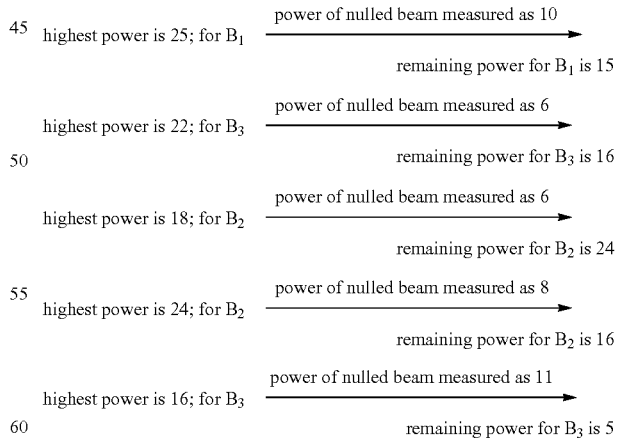

Thus, in this second example, the secondly nulled beam of the multi-arm beam $B_3$ satisfies the requirement for acceptable received power of 11. It can be noted that when two multi-level reception beams have the same remaining power, one is picked at random.

Figure 4:
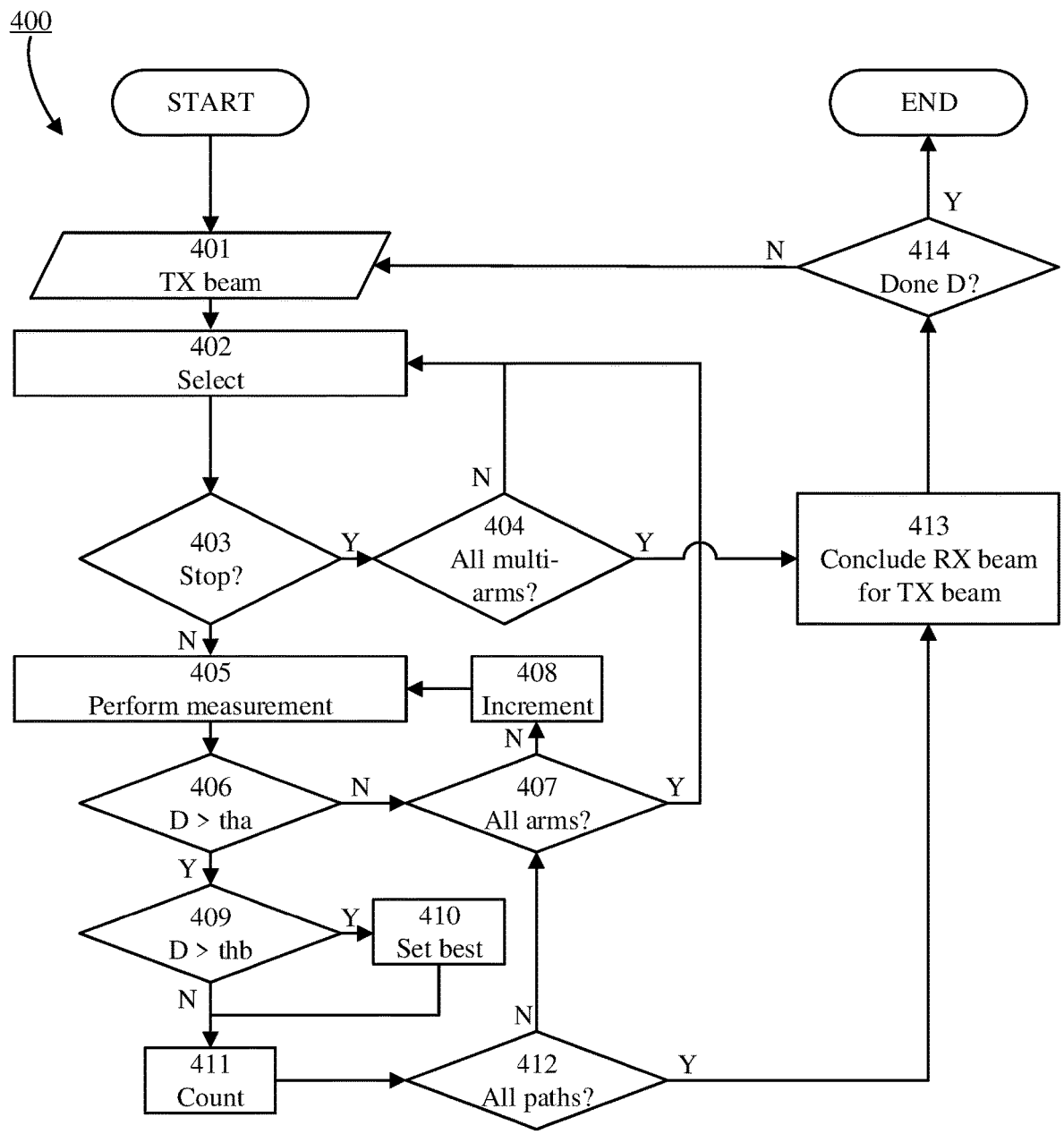
FIG. 4 is a flowchart illustrating example method steps according to some embodiments.

FIG. 4 illustrates an example method 400 according to some embodiments. The method 400 is for beam training of a receiver device configured for beamforming reception from a transmitter. For example, the method 400 may be performed by the receiver device. The method 400 may, for example, be seen as an implementation of the method 100 of FIG. 1. The method 400 is a dynamic beam training approach that uses knowledge of the number X of propagation paths of the wireless channel as a stopping criterion.

In contrast to the beam training method 300 of FIG. 3, where measurements may jump between multi-arm reception beams (path from step 313 through step 303 to 305) when one arm is found for a multi-arm reception beam, the method 400 in FIG. 4 continues to perform measurements for all arms of one multi-arm reception beam unless it reaches the maximum number of signal paths.

As illustrated by 401, the method 400 is performed per transmission (TX) beam (compare with 110 of FIG. 1). The transmitter activates the transmission beam under consideration and repeatedly transmits a reference signal (e.g., a pilot signal), while the receiver activates one multi-arm reception beam for each reference signal transmission to provide initial signal strength measurements (compare with step 120 of FIG. 1), saved in a vector p.

In step 402, a multi-arm reception beam b is selected (compare with step 130 of FIG. 1). Furthermore, an arm counter a is initiated to 1, $pow_{best}=p_{th}$, and $path_{count}=0$, where $path_{count}$ is a counter for the number of found paths.

In step 403, it is determined whether to stop the method 400 for the transmission beam under consideration (compare with step 170 of FIG. 1). The Y-path out of 403 is taken to arrive at step 404 when $pow_{res_b} \leq p_{th}$, where $pow_{res_i}=p(i)$. This may be interpreted as the Y-path out of 403 being taken when there is no prospect of finding a good enough reception beam in the multi-arm reception beam b. Otherwise the N-path out of 403 is taken to arrive at step 405.

In step 404, It is determined whether all multi-arm reception beams have been fully searched. If so, the Y-path out of 404 is taken to arrive at step 413. Otherwise, the N-path out of step 404 is taken to return to step 402 for selection of another multi-arm reception beam.

In step 405, measurements are performed for the selected multi-arm reception beam b with a arms nulled (compare with steps 140 and 150 of FIG. 1). Thus, the transmitter activates the transmission beam and transmits the reference signal, while the receiver nulls a arms of the multi-arm reception beam b and measures the received power p. The power difference between previous and current measurements is determined as $p_{ba}=pow_{res_b}-p$ (compare with step 160 of FIG. 1); representing the power of the most recently nulled arm. The current signal strength is updated for the selected multi-arm reception beam b; i.e., p(b)=p.

In step 406, it is determined whether the difference D (i.e., $p_{ab}$) exceeds a threshold value (tha) represented by $p_{th}$; i.e., whether the most recently nulled arm is good enough. If so, the Y-path out of 406 is taken to arrive at step 409. Otherwise, the N-path out of step 406 is taken to arrive at step 407.

In step 407, it is determined whether all arms of the multi-arm reception beam b have been examined; i.e., whether a>$arms_b$, where $arms_b$ denotes the number of arms of the multi-arm reception beam b. If so, the Y-path out of 407 is taken to return to step 402 for selection of another multi-arm reception beam. Otherwise, the N-path out of step 407 is taken to arrive at step 408. Alternatively, step 407 could comprise determining whether a≥ $arms_b$.

In step 408, the number of arms to be nulled for multi-arm reception beam b is incremented, a=a+1. In the method 400, the process then returns to step 405 to perform new measurements for multi-arm reception beam b.

In step 409, it is determined whether the difference D (i.e., $p_{ab}$) exceeds a threshold value (thb) represented by $pow_{best}$; i.e., whether the most recently nulled arm has the highest power found so far. If so, the Y-path out of 409 is taken to arrive at step 410. Otherwise, the N-path out of step 409 is taken to arrive at step 411.

In step 410, parameters defining the best reception beam found so far are updated as $pow_{best}=p_{ba}$, $best_{beam}=b$, and $best_{arm}=a$, and the method 400 proceeds to step 411.

In step 411, the path counter is incremented, $path_{count}=path_{count}+1$.

In step 412, it is determined whether all expected paths have been found; i.e., whether $path_{count}>X$. If so, the Y-path out of 412 is taken to arrive at step 413. Otherwise, the N-path out of step 412 is taken to arrive at step 407, where it is checked if the multi-arm reception beam b has more arms to examine.

In step 413, a reception (RX) beam is concluded for the transmission (TX) beam under consideration (compare with step 180 of FIG. 1); i.e., the reception beam represented by arm $best_{arm}$ of multi-arm reception beam $best_{beam}$.

Step 414 illustrates that the method 400 returns to 401 if there are more transmission (TX) beams to process. Otherwise, the method 400 is concluded.

It should be noted that, alternatively or additionally to step 403, one or more of steps 404, 406, 407, 409, and 412 may be considered as implementing stopping criteria (compare with step 170 of FIG. 1).

Generally, the methods 100, 300, 400 may be repeatedly executed (e.g., at regular time intervals, and/or triggered by an event such as a change of the channel environment).

Figure 5:
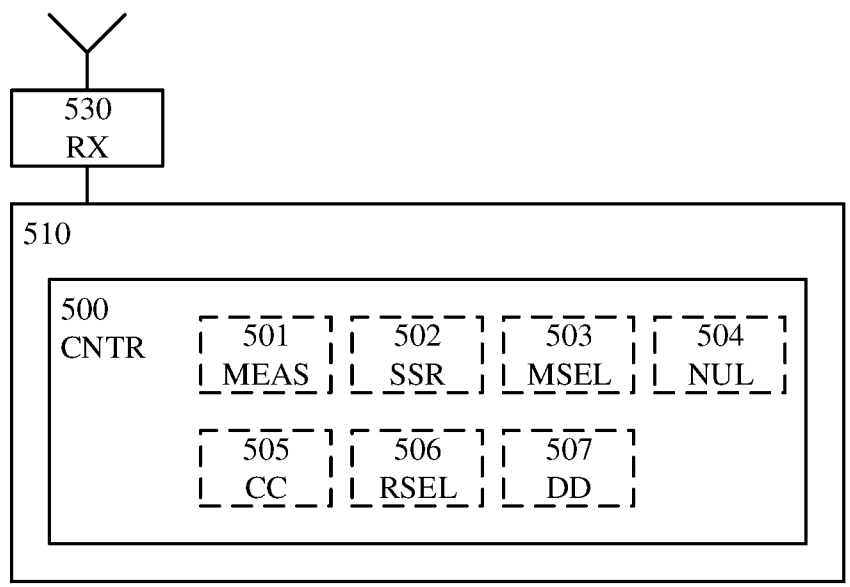
FIG. 5 is a schematic block diagram illustrating an example apparatus according to some embodiments.

FIG. 5 schematically illustrates an example apparatus according 510 to some embodiments. The apparatus 510 is for beam training of a receiver device configured for beamforming reception from a transmitter, wherein the beam training is based on a plurality of multi-arm reception beams.

For example, the apparatus 510 may be configured execute, or to cause execution of, one or more method steps as described in any of FIGS. 1, 3, and 4. Alternatively or additionally, the apparatus 510 may be comprised, or comprisable, in a receiver device (e.g., a user equipment, UE).

The apparatus 510 comprises a controller (CNTR; e.g., controlling circuitry or a control module) 500.

The controller 500 is configured to cause performance of signal strength measurements for multi-arm reception beams; possibly with one or more arms nulled (compare with steps 120 and 150 of FIG. 1).

To this end, the controller 500 may comprise, or be otherwise associated with (e.g., connected, or connectable, to) a measurer (MEAS; e.g., measuring circuitry or a measurement module) 501. The measurer 501 may be configured to perform the signal strength measurements.

The signal strength values as most recently measured/updated may be stored in a signal strength register (SSR; e.g., storing circuitry or a storage module) 502 for each of the multi-arm reception beams.

The controller 500 is also configured to cause selection of one of the multi-arm reception beams based on the signal strength measurements (compare with step 130 of FIG. 1).

To this end, the controller 500 may comprise, or be otherwise associated with (e.g., connected, or connectable, to) a multi-arm reception beam selector (MSEL; e.g., multi-arm reception beam selecting circuitry or a multi-arm reception beam selection module) 503. The multi-arm reception beam selector 503 may be configured to select the multi-arm reception beam.

The controller 500 is also configured to cause nulling of an arm for the selected multi-arm reception beam (compare with step 140 of FIG. 1).

To this end, the controller 500 may comprise, or be otherwise associated with (e.g., connected, or connectable, to) a nuller (NUL; e.g., nulling circuitry or a nulling module) 504. The nuller 504 may be configured to null the arm for the selected multi-arm reception beam.

The controller 500 may be configured to cause iteration of the multi-arm reception beam selection, the nulling, and the performance of signal strength measurement updates as described earlier herein.

Furthermore, the controller 500 may be configured to cause stopping of the iteration responsive to a stopping criterion being met (compare with step 170 of FIG. 1).

To this end, the controller 500 may comprise, or be otherwise associated with (e.g., connected, or connectable, to) a criterion checker (CC; e.g., checking circuitry or a check module) 505. The criterion checker 505 may be configured to determine whether the stopping criterion is met.

In any case, the controller 500 is configured to cause selection of a reception beam based on the signal strength measurements (compare with step 180 of FIG. 1).

To this end, the controller 500 may comprise, or be otherwise associated with (e.g., connected, or connectable, to) a reception beam selector (RSEL; e.g., reception beam selecting circuitry or a reception beam selection module) 506. The reception beam selector 506 may be configured to select the reception beam.

The selected reception beam may be used for subsequent communication (i.e., reception of communication signals transmitted from the transmitter using the corresponding transmission beam).

To this end, the controller 500 may comprise, or be otherwise associated with (e.g., connected, or connectable, to) a receiver (RX; e.g., receiving circuitry or a reception module) 530. The receiver 530 may be configured to use the selected reception beam for communication.

The controller 500 may be configured to cause determination of a difference between signal strength measurements before and after an update (compare with step 160 of FIG. 1).

To this end, the controller 500 may comprise, or be otherwise associated with (e.g., connected, or connectable, to) a difference determiner (DD; e.g., determining circuitry or a determination module) 507. The difference determiner 507 may be configured to determine the difference.

The difference may be used by one of more of the criterion checker 505 and the reception beam selector 506, as explained and exemplified earlier herein In some embodiments, the controller 500 may be configured to cause execution of the method 100 of FIG. 1 for each of a plurality of transmission beams of the transmitter.

It should be noted that any suitable feature explained above in relation to FIGS. 1, 2A, 2B, 3, and/or 4 may be equally applicable for the apparatus 510, even if not explicitly mentioned in connection thereto.

The described embodiments and their equivalents may be realized in software or hardware or a combination thereof. The embodiments may be performed by general purpose circuitry.

Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a receiver device or a user equipment.

Embodiments may appear within an electronic apparatus (such as a receiver device or a user equipment) comprising arrangements, circuitry, and/or logic according to any of the embodiments described herein. Alternatively or additionally, an electronic apparatus (such as a receiver device or a user equipment) may be configured to perform methods according to any of the embodiments described herein.

Figure 6:
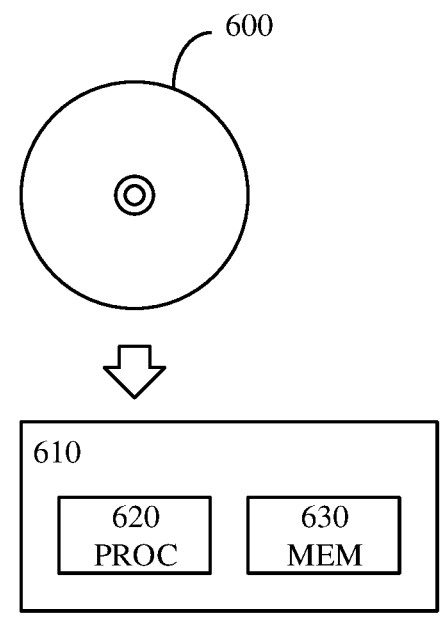
FIG. 6 is a schematic drawing illustrating an example computer readable medium according to some embodiments.

According to some embodiments, a computer program product comprises a tangible, or non-tangible, computer readable medium such as, for example a universal serial bus (USB) memory, a plug-in card, an embedded drive or a read only memory (ROM). FIG. 6 schematically illustrates an example computer readable medium in the form of a compact disc (CD) ROM 600. The computer readable medium has stored thereon a computer program comprising program instructions. The computer program is loadable into a data processor (PROC; e.g., data processing circuitry or a data processing unit) 620, which may, for example, be comprised in a receiver device or a user equipment 610. When loaded into the data processor, the computer program may be stored in a memory (MEM) 630 associated with or comprised in the data processor. According to some embodiments, the computer program may, when loaded into and run by the data processor, cause execution of method steps according to, for example, any of the methods illustrated in FIGS. 1, 3, 4, or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable.

Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method for beam training of a receiver device configured for beamforming reception from a transmitter, wherein the beam training is based on a plurality of multi-arm reception beams, the method comprising:
performing signal strength measurements for each of the multi-arm reception beams;
selecting one of the multi-arm reception beams based on the signal strength measurements;
nulling one arm for the selected multi-arm reception beam;
updating the signal strength measurements by performing signal strength measurements for the selected multi-arm reception beam with the arm nulled;
determining a difference between signal strength measurements before and after the update;
iteratively repeating the selecting, nulling, updating and determining steps, in order to obtain further signal strength measurements for multi-arm reception beams with additional arms nulled;
stopping the iteration when a stopping criterion is met, the stopping criterion comprising one or more of:
a nulled arm corresponding to an arm signal strength that exceeds a first threshold value; and
none of the multi-arm reception beams having a signal strength that exceeds a second threshold value; and
selecting a reception beam, based on the determined differences between signal strength measurements before and after the updates.

2. The method of claim 1, wherein selecting one of the multi-arm reception beams based on the signal strength measurements comprises selecting a multi-arm reception beam with a highest signal strength among the multi-arm reception beams.

3. The method of claim 1, wherein nulling one arm for the selected multi-arm reception beam comprises nulling a randomly picked arm that has not yet been nulled.

4. The method of claim 1, wherein nulling one arm for the selected multi-arm reception beam comprises nulling an arm with a highest arm signal strength among arms that have not yet been nulled obtained during a previous beam training session.

5. The method of claim 1, wherein nulling one arm for the selected multi-arm reception beam comprises nulling an arm with a highest statistical signal strength among arms that have not yet been nulled according to an applied channel model.

6. The method of claim 1, wherein selecting the reception beam based on the determined differences comprises selecting the reception beam as an arm that corresponds to a highest difference among arms nulled during signal strength measurements.

7. The method of claim 1, wherein the method is performed for each of a plurality of transmission beams of the transmitter.

8. An apparatus for beam training of a receiver device configured for beamforming reception from a transmitter, the beam training being based on a plurality of multi-arm reception beams, the apparatus comprising controlling circuitry configured to cause:
performance of signal strength measurements for each of the multi-arm reception beams;
selection of one of the multi-arm reception beams based on the signal strength measurements;
nulling of one arm for the selected multi-arm reception beam;
updating of the signal strength measurements by performance of signal strength measurements for the selected multi-arm reception beam with the arm nulled;
determination of a difference between signal strength measurements before and after the update;
iterative repetition of the selecting, nulling, updating and determination steps, in order to obtain further signal strength measurements for multi-arm reception beams with additional arms nulled; and
stopping the iteration responsive to a stopping criterion being met, the stopping criterion comprising one or more of:
a nulled arm corresponding to an arm signal strength that exceeds a first threshold value; and
none of the multi-arm reception beams having a signal strength that exceeds a second threshold value; and
selection of a reception beam, based on the signal strength measurements before and after the updates.

9. The apparatus of claim 8, wherein the controlling circuitry is configured to cause selection of one of the multi-arm reception beams based on the signal strength measurements by causing selection of a multi-arm reception beam with a highest signal strength among the multi-arm reception beams.

10. The apparatus of claim 8, wherein the controlling circuitry is configured to cause nulling of one arm for the selected multi-arm reception beam by causing nulling of a randomly picked arm that has not yet been nulled.

11. The apparatus of claim 8, wherein the controlling circuitry is configured to cause nulling of one arm for the selected multi-arm reception beam by casing nulling of an arm with a highest arm signal strength among arms that have not yet been nulled obtained during a previous beam training session.

12. The apparatus of claim 8, wherein the controlling circuitry is configured to cause nulling of one arm for the multi-arm reception beam by casing nulling of an arm with a highest statistical signal strength among arms that have not yet been nulled according to an applied channel model.

13. The apparatus of claim 8, wherein the controlling circuitry is configured to cause selection of the reception beam based on the determined differences by causing selection of the reception beam as an arm that corresponds to a highest difference among arms nulled during signal strength measurements.

14. The apparatus of claim 8, wherein a plurality of transmission beams are transmitted by the transmitter, and wherein the controlling circuitry is configured to cause the performance of signal strength measurements, selection of the one of the multi-arm reception beams, nulling of the one arm, updating of the signal strength measurements, determination of the difference, iterative repetition of the selecting, nulling, updating and determination, stopping the iteration and selection of the reception beam, for each of the plurality of transmission beams.

15. The apparatus of claim 8, wherein the apparatus is comprised in a receiver device.

16. The apparatus of claim 8, wherein the apparatus is comprised in a user equipment.

* * * * *